United States Patent
Sakurai et al.

(10) Patent No.: US 12,454,193 B2
(45) Date of Patent: Oct. 28, 2025

(54) DATA UPDATE SYSTEM FOR ELECTRONIC CONTROL DEVICES

(71) Applicant: DENSO CORPORATION, Kariya (JP)

(72) Inventors: Nao Sakurai, Kariya (JP); Taiji Abe, Kariya (JP)

(73) Assignee: DENSO CORPORATION, Kariya (JP)

( * ) Notice: Subject to any disclaimer, the term of this patent is extended or adjusted under 35 U.S.C. 154(b) by 681 days.

(21) Appl. No.: 17/900,962

(22) Filed: Sep. 1, 2022

(65) Prior Publication Data

US 2022/0410754 A1    Dec. 29, 2022

Related U.S. Application Data

(63) Continuation of application No. PCT/JP2021/007693, filed on Mar. 1, 2021.

(30) Foreign Application Priority Data

Mar. 6, 2020  (JP) ................. 2020-038734

(51) Int. Cl.
  *B60L 53/66*   (2019.01)
  *G06F 8/65*    (2018.01)
  *H04W 4/44*    (2018.01)

(52) U.S. Cl.
  CPC ............... *B60L 53/66* (2019.02); *G06F 8/65* (2013.01); *H04W 4/44* (2018.02); *B60L 2270/40* (2013.01)

(58) Field of Classification Search
  CPC ........ B60L 53/66; B60L 2270/40; G06F 8/65; H04W 4/44
  See application file for complete search history.

(56) References Cited

U.S. PATENT DOCUMENTS

| | | |
|---|---|---|
| 2013/0132939 A1 | 5/2013 | Murata et al. |
| 2018/0029489 A1 | 2/2018 | Nordbruch |
| 2018/0063285 A1 | 3/2018 | Nordbruch |
| 2019/0114162 A1 | 4/2019 | Izumi |
| 2019/0129710 A1 | 5/2019 | Izumi |
| 2019/0215370 A1* | 7/2019 | Granda ................. H04L 67/12 |
| 2019/0332371 A1 | 10/2019 | Kobayashi |
| 2023/0347776 A1* | 11/2023 | McLachlan ............ B60L 58/13 |
| 2024/0272894 A1* | 8/2024 | Green .................... B60L 58/10 |
| 2025/0200185 A1* | 6/2025 | Kohta .................... B60L 53/66 |

FOREIGN PATENT DOCUMENTS

| | | |
|---|---|---|
| JP | 2011053954 A | 3/2011 |
| JP | 2018086894 A | 6/2018 |
| JP | 2018100002 A | 6/2018 |
| JP | 6358286 B2 | 7/2018 |
| WO | WO-2011161778 A1 | 12/2011 |

\* cited by examiner

*Primary Examiner* — Jacob M Amick
(74) *Attorney, Agent, or Firm* — Harness, Dickey & Pierce, P.L.C.

(57) ABSTRACT

A data update device for electronic control devices includes: a charge schedule setting unit for setting a charge schedule of a battery of an electric vehicle; a charge control unit for charging the battery according to the charge schedule; and a data update control unit for updating data of one electronic control device by acquiring update data from a center device on a condition that an acknowledgement of the user is obtained when receiving a notification of the update data from the center device together with information about time required for the updating, and determining that the updating is possible even if the charge control unit charges the battery according to the charge schedule.

10 Claims, 22 Drawing Sheets

FIG. 2

(1) EX OF SCHE SET
　　　START

00:00 ~　　MON
　　　02:30 ~　　TUE
　　　XX:XX ~　　WED
　　　XX:XX ~　　THU
　　　XX:XX ~　　FRI
　　　XX:XX ~　　SAT
　　　XX:XX ~　　SUN (2) EX OF SCHE SET
　　　FROM START TO END

00:00~02:00　　MON
02:30~04:30　　TUE
XX:XX~YY:YY　　WED
XX:XX~YY:YY　　THU
XX:XX~YY:YY　　FRI
XX:XX~YY:YY　　SAT
XX:XX~YY:YY　　SUN (3) EX OF SCHE SET
　　　END

~07:00　　MON
　　　~07:00　　TUE
　　　~07:00　　WED
　　　~07:00　　THU
　　　~07:00　　FRI
　　　~YY:YY　　SAT
　　　~YY:YY　　SUN (4) CHA TIME

XX:XX

EX : 02:00 (2 HOURS)
EX : 10:00 (10 HOURS)

DATA UPDATE SYSTEM FOR ELECTRONIC CONTROL DEVICES

CROSS REFERENCE TO RELATED APPLICATIONS

The present application is a continuation application of International Patent Application No. PCT/JP2021/007693 filed on Mar. 1, 2021, which designated the U.S. and claims the benefit of priority from Japanese Patent Application No. 2020-038734 filed on Mar. 6, 2020. The entire disclosures of all of the above applications are incorporated herein by reference.

TECHNICAL FIELD

The present disclosure relates to a device and a system for updating data stored in multiple electronic control devices mounted on an electric vehicle.

BACKGROUND

In recent years, the scale of application programs for vehicle control, diagnosis, and the like, installed in an ECU (i.e., Electronic Control unit) as an electronic control device of a vehicle, has been increased due to the diversification of vehicle control such as a driving support function and an autonomous driving function. An opportunity to rewrite, known as reprogram, an application program of an ECU has been increased in accordance with upgrading based on functional improvement. On the other hand, a technique for connected cars has also spreads together with the progress of communication networks or the like. In this regard, for example, a conceivable technique teaches that an ECU update program is distributed from a center to an in-vehicle device by OTA (i.e., Over The Air), and rewrite the update program on the vehicle side.

SUMMARY

According to an example, a data update device for electronic control devices includes: a charge schedule setting unit for setting a charge schedule of a battery of an electric vehicle; a charge control unit for charging the battery according to the charge schedule; and a data update control unit for updating data of one electronic control device by acquiring update data from a center device on a condition that an acknowledgement of the user is obtained when receiving a notification of the update data from the center device together with information about time required for the updating, and determining that the updating is possible even if the charge control unit charges the battery according to the charge schedule.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram showing a setting example of a charge schedule;

FIG. 20 is a diagram illustrating a screen when an ignition switch turns on;

DETAILED DESCRIPTION

Figure 1:
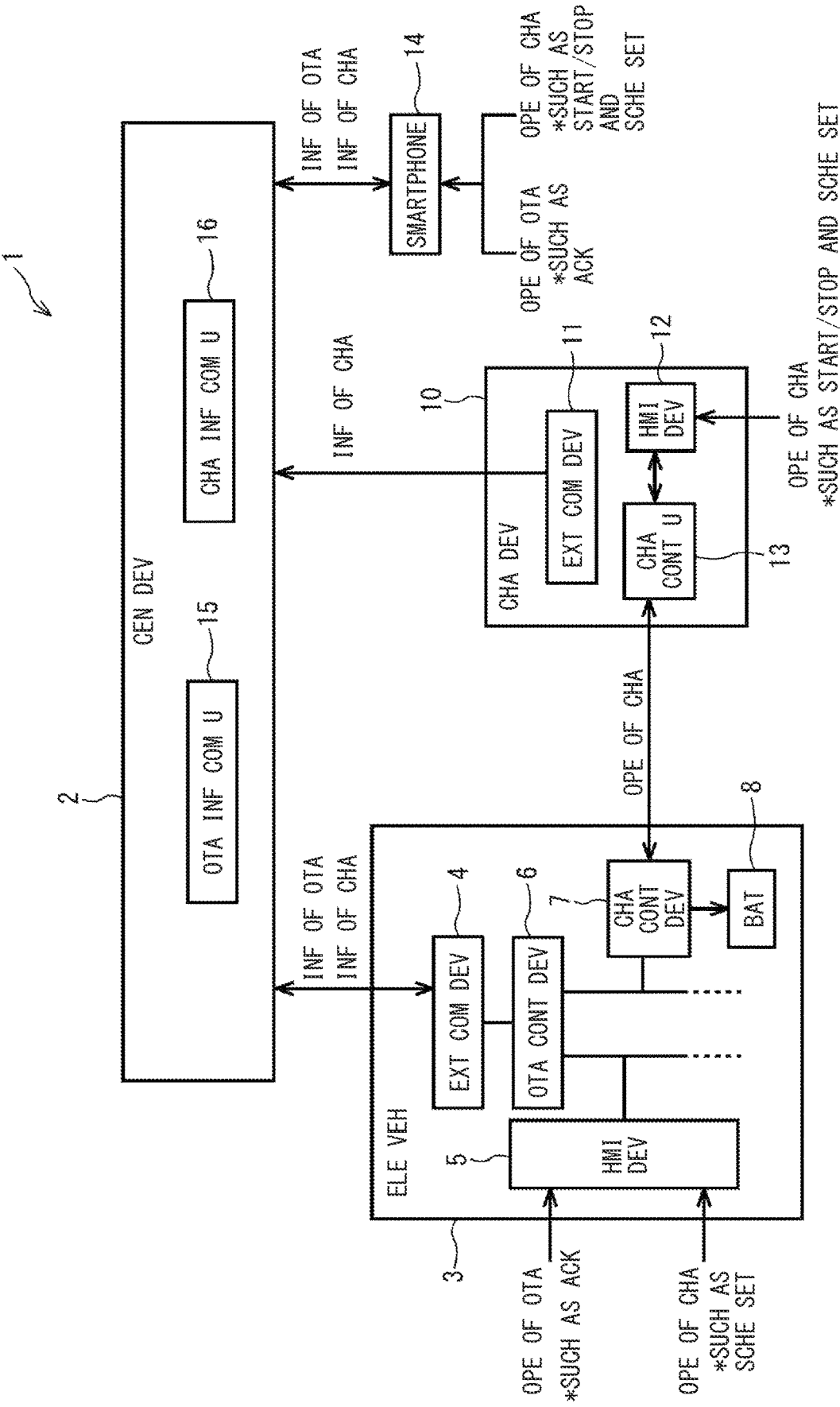
FIG. 1 is a functional block diagram showing main parts in the configuration of a data update system in a first embodiment.

Since it takes a certain amount of time to rewrite the program, if the center device tries to rewrite the program unilaterally, there may be a difficulty that the user will not be able to use the vehicle depending on the state of the vehicle at that time. In particular, if the vehicle is an electric vehicle, it will take a relatively long time to charge the battery, so there may be more restrictions. The conceivable technique teaches a software update device that estimates an available time slot in which a program can be updated, notifies the user of the available time slot, and updates the program in the available time slot specified by the user.

However, even if it is an available time slot specified by the user, there may be no guarantee that it will be an available time slot at the time the program is actually rewritten. Thus, if the center device starts to execute the rewriting, there may be a possibility of the difficulty for the user.

The present embodiments have been made in view of the circumstances described above, and the present embodiments provide a data update device for an electronic control device and a data update system for electronic control device for updating data in an in-vehicle device mounted on an electric vehicle while more reliably avoiding inconvenience to the user.

According to the data update device for the electronic control device, the user sets the charge schedule for charging the battery of the electric vehicle via the charge schedule setting unit. When the charge device is connected to the electric vehicle, the charge control unit charges the battery according to the charge schedule. When the data update control unit receives from the center device a notification that the data to be stored in the electronic control device will be updated together with information on the time required for the update, and the data update control unit determines that the data can be updated even if the charge control unit charges the battery according to the charge schedule, the data update control unit acquires the update data from the center device on the condition that the user's consent to the data update is obtained, and updates the data of the target electronic control device.

With this configuration, the data update control unit updates the data of the electronic control device after obtaining the consent of the user, thereby further reducing the possibility that the user will be inconvenienced when the update is performed.

According to the data update device for the electronic control device, the data update control unit determines that the data can be updated when the charge control unit charges the battery of the electric vehicle according to the charge schedule, the data update control unit acquires the update data from the center device and updates the data of the electronic control device on the condition that the data update control unit inquires the acknowledgement of the user and receives acknowledgement. According to this configuration, the user's consent is inquired before the data of the electronic control device is updated, so that the user's consent can be obtained more reliably.

According to the data update device for the electronic control device, the charge schedule setting unit sets, as the charge schedule, at least one of the charge start time, the charge end time, the start and end time of charging, and the charge time from the present time. Thereby, the charge schedule can be flexibly set according to the convenience of the user.

According to the data updating device for an electronic control device, the data update process includes: a first phase of acquiring update data from the center device; a second phase of writing the acquired update data to a target electronic control device; and a third phase of validating the updated data written to the electronic control device. Then, the data update control unit executes the corresponding phase after confirming that the user has performed an input operation to acknowledge the execution of one or more phases. Thereby, according to the user's convenience, the acquisition phase, the writing phase, and the validation phase of the update data can be executed after obtaining the user's consent.

First Embodiment

Next, the first embodiment will be described. As shown in FIG. 1, in the data update system 1, the center device 2 and the electric vehicle 3 communicate with each other to exchange various information. In the following description, "OTA (over the air)" refers to data update processing of the ECU mounted on the electric vehicle 3 through wireless communication between the center device 2 and the electric vehicle 3. The electric vehicle 3 performs wireless communication with the center device 2 via the external communication device 4. The HMI (i.e., Human Machine Interface) device 5 is an interface for the user to perform an input operation, and the user performs input operations such as "acknowledgement" regarding the OTA and the schedule setting when charging the battery via the HMI device 5. Also, the HMI device 5 displays a message or the like for the user on a display screen (not shown).

The OTA control unit 6 is connected to the external communication device 4, the HMI device 5 and the charge control unit 7. The charge control unit 7 controls the charging of a battery 8 that supplies drive power to a driving motor (not shown) of the electric vehicle 3. The OTA control unit 6 executes the update processing with respect to multiple ECUs (not shown) connected via the bus and sends an instruction relating to the charge in the battery 8 to the charge control unit 7, according to the information of the OTA and the charge received from the center device 2 and the operation information of the user input from the HMI device 5. The HMI device 5 is an example of a charge schedule setting unit, and the OTA control unit 6 is an example of a data update control unit.

The charge device 10 is installed, for example, in a user's home or in the city, and includes an external communication device 11, an HMI device 12 and a charge control unit 13. The external communication device 11 performs wireless communication with the center device 2 in the same manner as the external communication device 4. The HMI device 13, similar to the HMI device 5, is an interface for the user to input operations and the like. The charge control unit 13 communicates with the charge control unit 7 of the electric vehicle 3 and gives instructions regarding the charging of the battery 8.

The smartphone 14 is a smart cell phone carried by the user, and this smartphone 14 also performs wireless communication with the center device 2. The user can also input information similar to that of the HMI devices 5 and 13 by operating the smartphone 14. The smartphone 14 is also an example of a charge schedule setting unit.

The center device 2 includes an OTA information communication unit 15 and a charge information communication unit 16. The OTA information communication unit 15 performs wireless communication with the external communication device 4 of the electric vehicle 3, and transmits and receives OTA information, which is information regarding data update of ECUs as electronic control devices installed in the electric vehicle 3, and information relating to the charge of the battery 8 to and from the electric vehicle 3. The charge information communication unit 16 performs wireless communication with the external communication device 11 of the charge device 10 and transmits/receives information regarding charging of the battery 8 to/from the electric vehicle 3.

Next, an operation of the present embodiment will be described. A user presets a schedule for charging the battery 8 of the electric vehicle 3. The setting of the charge schedule includes: for example, as shown in FIG. 2, (1) setting the start time to "at 00:00 on Monday" or "at 02:30 on Tuesday";
(2) setting the period from the start time and to the end time to "from 00:00 to 02:00 on Monday", or setting to "from 02:30 to 04:30 on Tuesday";
(3) setting the end time to "at 07:00 on Monday" or "at 07:00 on Tuesday";
(4) setting the charging time to "02:00 (i.e., 2 hours)" or "10:00 (i.e., 10 hours)"; and/or the like.

Figure 3:
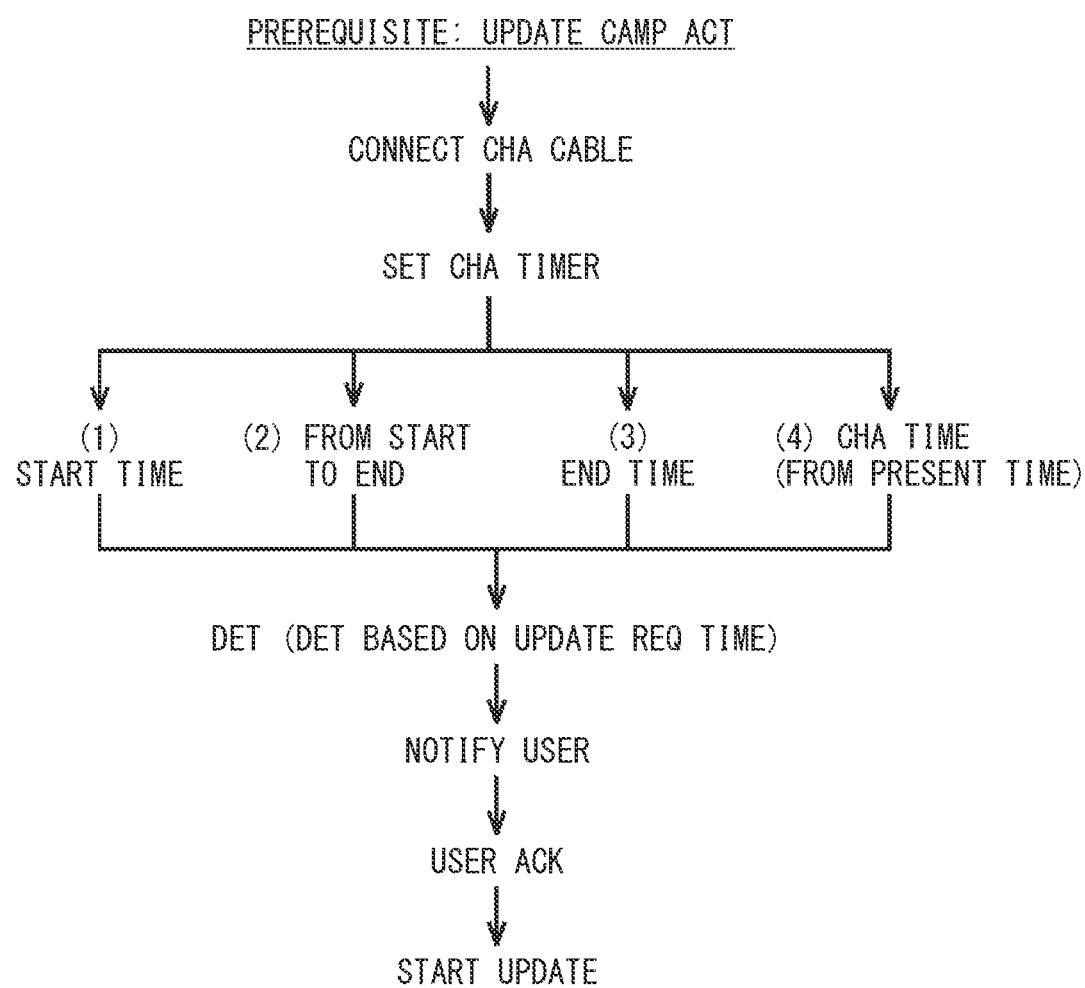
FIG. 3 is a diagram schematically showing a process from when a charge cable is connected to an electric vehicle to when an ECU program update is started.

The "update campaign" shown in FIG. 3 is information indicating that a new program is available for the ECU and it is necessary to update the ECU. The update campaign information is prepared on the side of the center device 2 and is transmitted to the vehicle equipped with the ECU as an update target of the program. "Update campaign activated" indicates that the electric vehicle 3 has already received the update campaign information. The transmission of the update campaign information from the center device 2 to the vehicle corresponds to "notification that the data to be stored in the electronic control device should be updated".

When the charge cable is connected to the electric vehicle 3, a timer for managing the charging time in the charge control unit 7 is set according to the setting of the charge schedule of (1) to (4) shown in FIG. 2. The update campaign information also includes update required time, which is the time required to update the program. The OTA control unit 6 compares the time or the time period when the battery 8 is charged according to the setting of the charge schedule with the update required time, and determines whether or not it is possible to update the program from now on. If update execution is possible, the possibility is notified to the user through the HMI device 5, and if the user acknowledges the update execution, the update is started.

Figure 4:
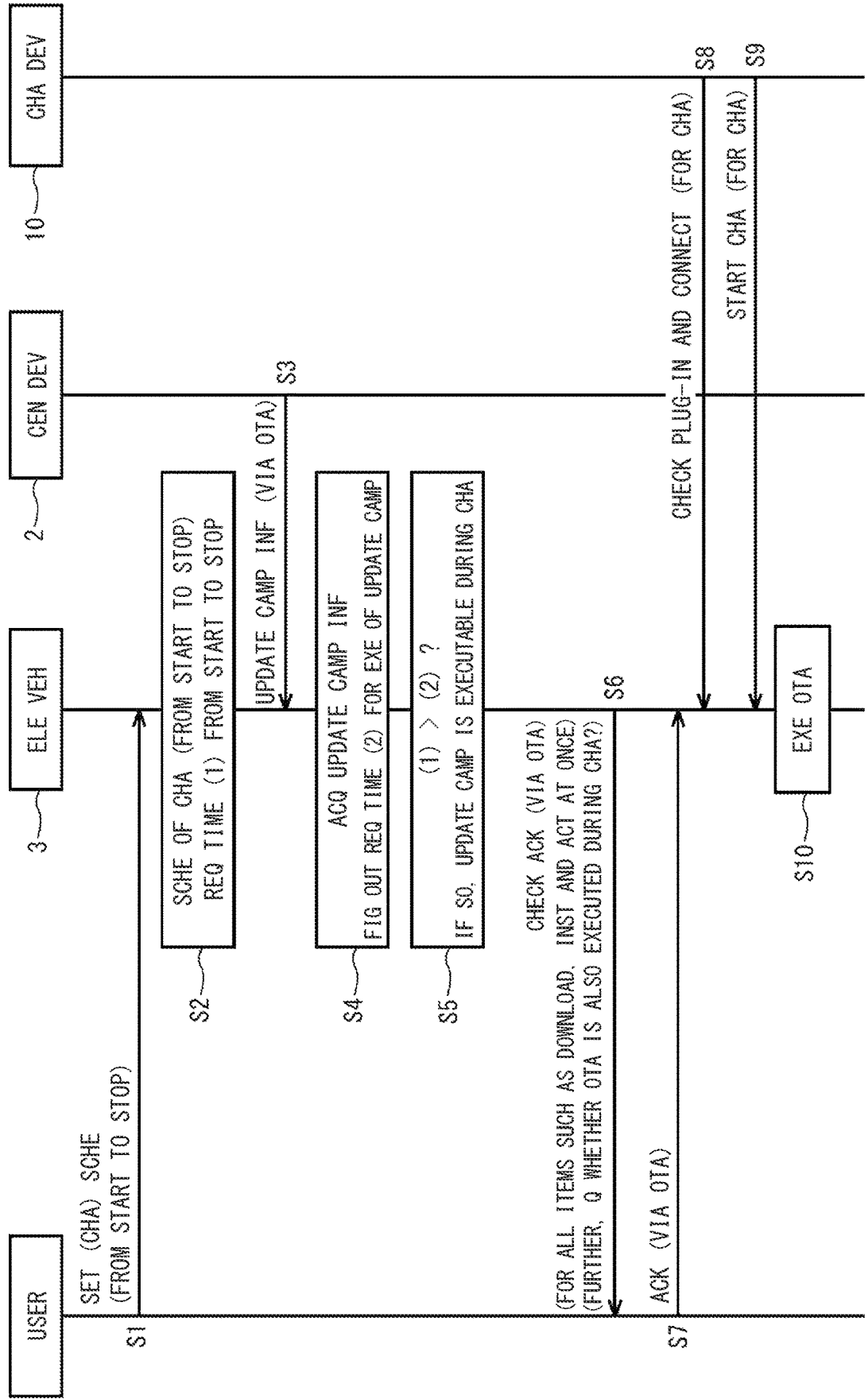
FIG. 4 is a sequence diagram showing a process performed among a user, an electric vehicle, a center device, and charge device.

Next, a more detailed example of the flow of processing described above will be described with reference to FIG. 4. It should be noted that there may be a part that does not match FIG. 3 with respect to the sequential relationship of processing timing. A user sets a charge schedule via the HMI device 5 inside the electric vehicle 3 (at S1). Then, the charge control unit 7 schedules the charging according to the set schedule (at S2). The information scheduled here is also shared with the OTA control unit 6. Also, the time from the start to the stop of charging, that is, the charging time is defined as the time (1).

When the center device 2 transmits the update campaign information to the electric vehicle 3 (at S3), the OTA control unit 6 acquires the information (at S4). At this time, the OTA control unit 6 grasps the time (2) required for the update campaign execution included in the above information. The time (2) is the total time for downloading the update program, installing the update program in the ECU, and activating the installed update program to validate the program.

Then, when the OTA control unit 6 confirms that the time (1) is longer than the time (2), i.e., that the update campaign is executable while the battery 8 is being charged (at S5), the HMI device 5 checks whether the user has acknowledged with respect to the OTA (at S6). Note that "acknowledgement to the OTA" indicates the execution of the update campaign for the electric vehicle 3 is performed by the center device 2 via the OTA.

When the user acknowledges with respect to the OTA (at S7) and connects the charge plug of the electric vehicle 3 to the charge device 10, the connection confirmation is sent to the OTA control unit 6 and charge control unit 7 (at S8). Then, the charge device 10 starts charging the battery 8 via the charge control unit 7 (S9), and then the OTA control unit 6 starts executing the OTA process (at S10).

As described above, according to this embodiment, the user sets the charge schedule for charging the battery 8 of the electric vehicle 3 via the HMI device 5. When the charge device 10 is connected to the electric vehicle 3, the charge control unit 7 charges the battery 8 according to the charge schedule. When the OTA control unit 6 receives the update campaign information together with the time required to execute the update campaign process from the center device 2, and the OTA control unit 6 determines that the program can be updated even if the charge control unit 7 charges the battery 8 according to the charge schedule, the OTA control unit 6 obtains the update program from the center device 2 and updates the program in the target ECU on the condition that the user's consent to the update is obtained.

With this configuration, the OTA control unit 6 updates the ECU program after obtaining the consent of the user, so that the possibility of causing inconvenience to the user when the update is performed can be further reduced.

At that time, the OTA control unit 6 acquires the update program from the center device 2 and updates the target ECU program on the condition that the unit 6 inquires the acknowledgement of the user, and the user inputs the acknowledgement. That is, the user's consent is inquired before the data in the ECU is updated, so that the user's consent can be obtained more reliably.

In addition, the HMI device 5 can set any one or more of the charge start time, the charge end time, the charge start and end time period, and the charging time from the current time point as the charge schedule, so that the HMI device 5 can flexibly set the charge schedule according to the user's needs.

Second Embodiment

Figure 5:
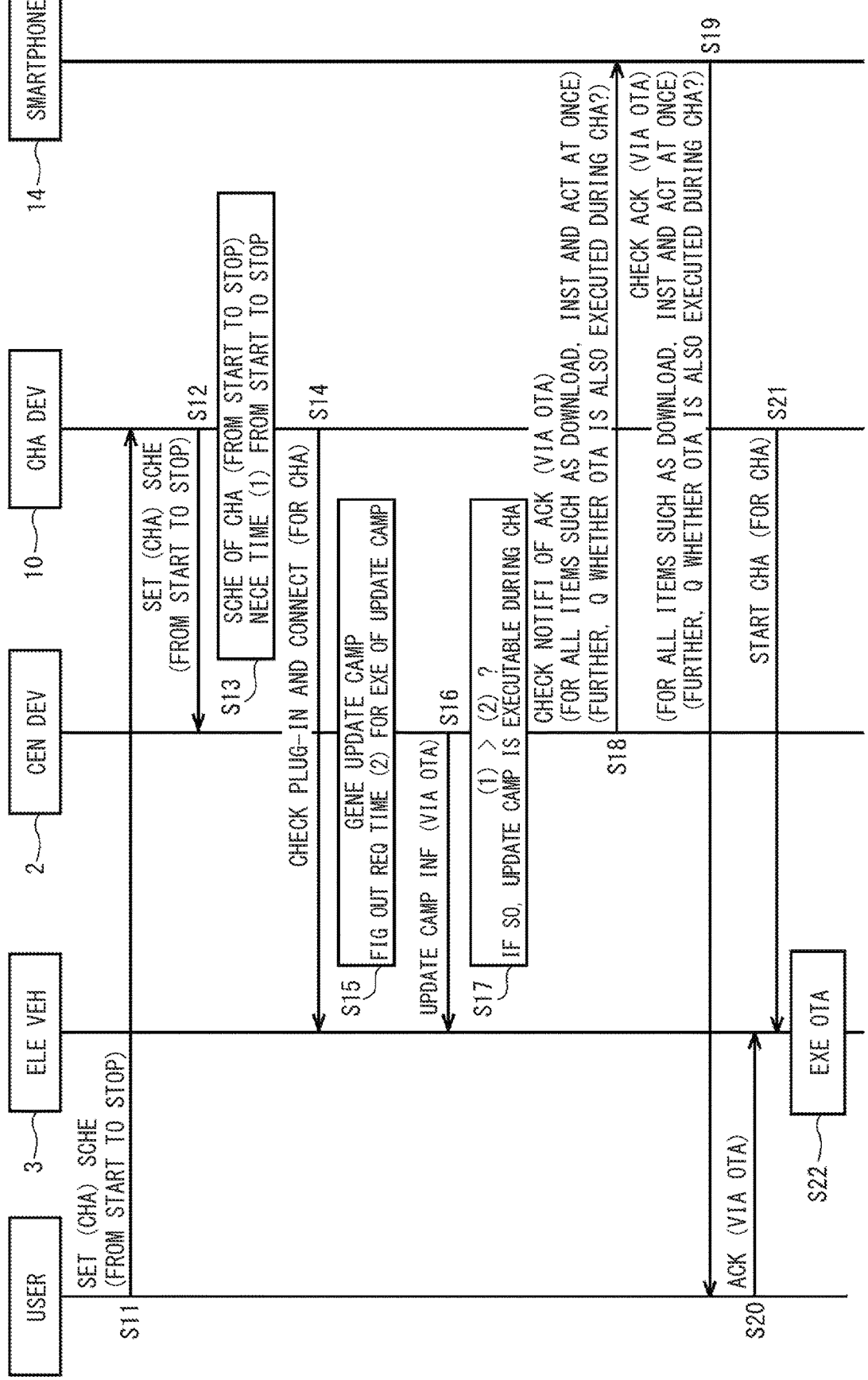
FIG. 5 is a sequence diagram showing a process performed among a user, an electric vehicle, a center device, a charge device, and a smartphone in the second embodiment.

Hereinafter, the identical parts as those in the first embodiment will be designated by the same reference numerals for simplification of the description. Only differences from the first embodiment will be described below. In the second embodiment shown in FIG. 5, the user sets the charge schedule for the charge device 10 outside the vehicle and communicates with the center device 2 using the smartphone 14. The user sets a charge schedule using the HMI device 12 of the charge device 10 (at S11). After transferring the set schedule to the center device 2 (at S12), the charge device 10 schedules the charge according to the set schedule (at S13). When the user connects the charge plug of the electric vehicle 3 to the charge device 10, confirmation of the connection is sent to the OTA control unit 6 and the charge control unit 7 (at S14).

In the center device 2, when the application program of any ECU is updated, the update campaign information is generated accordingly. At this time, similarly to step S4, the time (2) required for executing the update campaign process is grasped (at S15). The time (2) is the total time obtained by accumulating the time a required for downloading the update program, the time b required for installing the update program to the ECU, and the time c required for activating the installed update program to validate the program. These times may be calculated by the center device 2 based on the size of the update data, or may be input by the operator of the center device 2. Then, the center device 2 transmits the update campaign information to the electric vehicle 3 (at S16).

In addition, since the center device 2 can also grasp the time (1) from the charge schedule transferred from the charge device 10, when confirming that the time (1) is longer than the time (2) (at S17), the center device 2 performs the notification to the user's smartphone 14 for confirming the acknowledgement with respect to the OTA process (at S18). The user visually confirms the message displayed on the screen of the smartphone 14, and if there is an intention to accept, the user inputs "acknowledgement" via the HMI device 5 of the electric vehicle 3 (at S20). After that, when the charge start time arrives based on the charge schedule, the charge device 10 starts charging the battery 8 (at S21). Subsequently, the OTA control unit 6 starts executing the OTA process (at S20).

As described above, according to the second embodiment, the user can use the smartphone 14 as an HMI device to perform the same processing as in the first embodiment.

Third Embodiment

Figure 6:
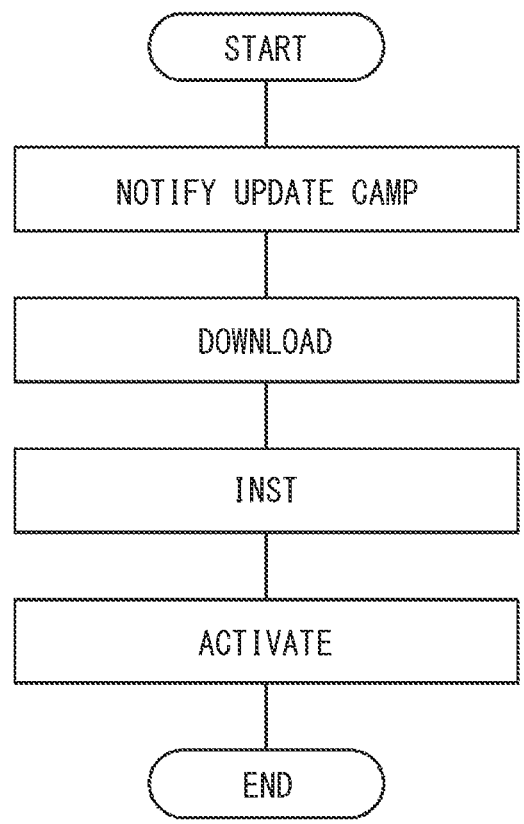
FIG. 6 is a diagram showing each phase when an application program of an ECU is rewritten by executing an OTA process in a third embodiment.

The third embodiment shows a display example of a screen included in the HMI device 5 in the first embodiment, for example. As illustrated in FIG. 6 and described above, when an application program of the rewrite target ECU is rewritten through the OTA process, there are the first to third phases of a campaign notification, download, installation, and activation. The campaign notification is a notification of program update. For example, the campaign notification indicates that the OTA control unit 6 downloads distribution specification data or the like in response to a determination that update of an application program is available in the center device 2. The HMI device 5 displays a screen in each phase as rewriting of the application program progresses. Here, the OTA control unit 6 executes download, installation, and activation mainly.

Figure 7:
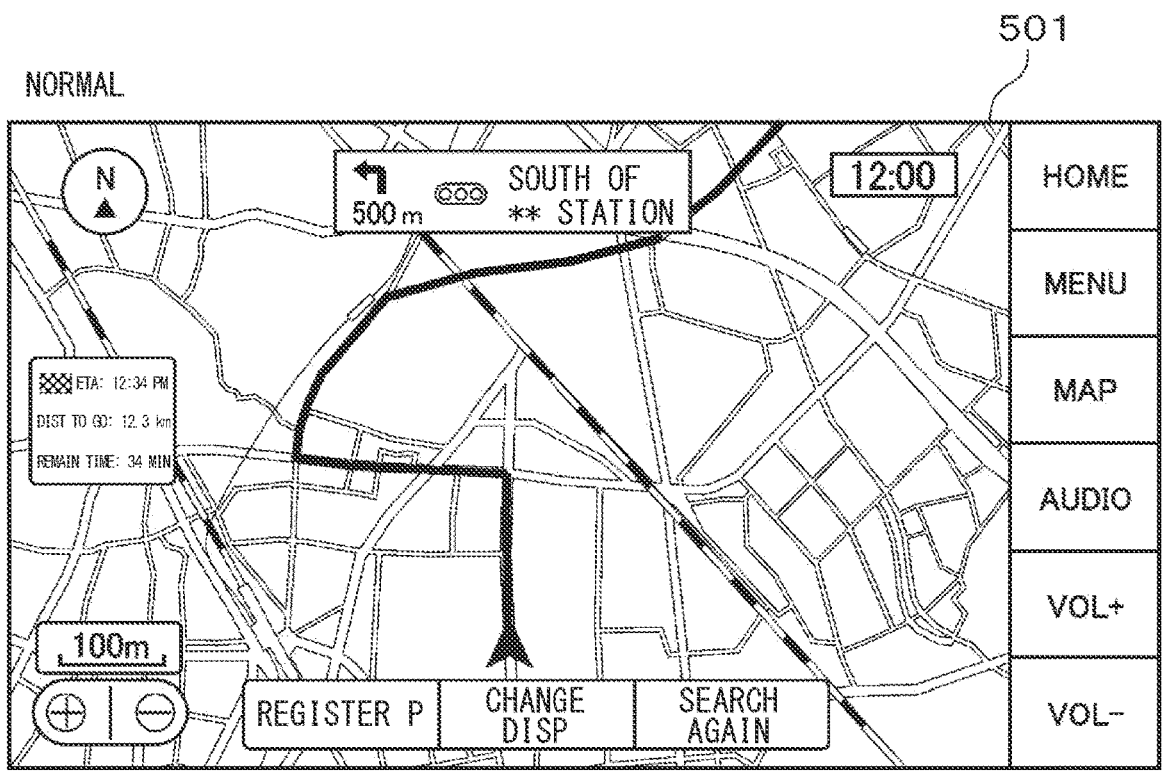
FIG. 7 is a diagram showing a normal screen on the HMI device.
Figure 8:
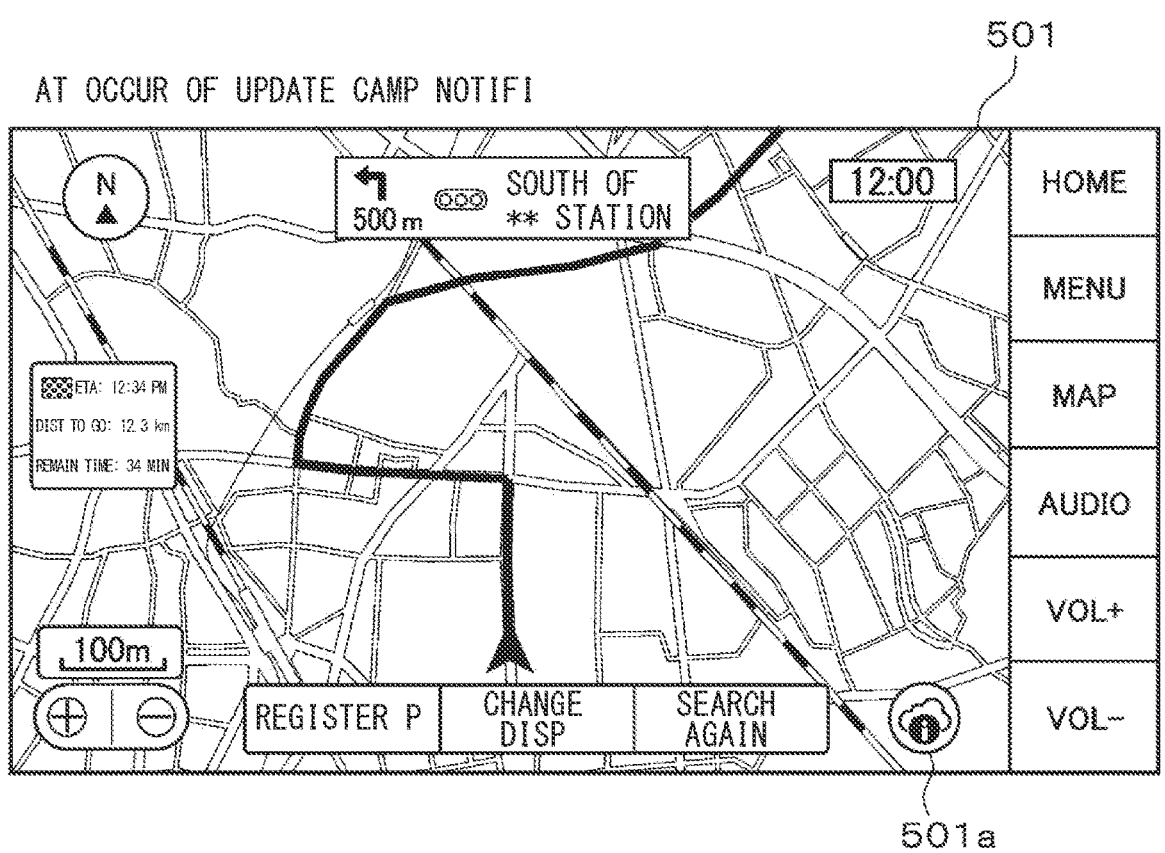
FIG. 8 is a diagram illustrating a screen when a update campaign notification occurs.

As shown in FIG. 7, the HMI device 5 normally displays a navigation screen 501 such as a well-known route guidance screen, which is one of the navigation functions, during normal times before notification of the update campaign. When the update campaign notification occurs in this state, the HMI device 5 displays an update campaign notification icon 501a indicating the occurrence of the update campaign notification on the lower right of the navigation screen 501, as illustrated in FIG. 8. The user can recognize the occurrence of the update campaign notification regarding the update of the application program by checking the display of the update campaign notification icon 501a.

Figure 9:
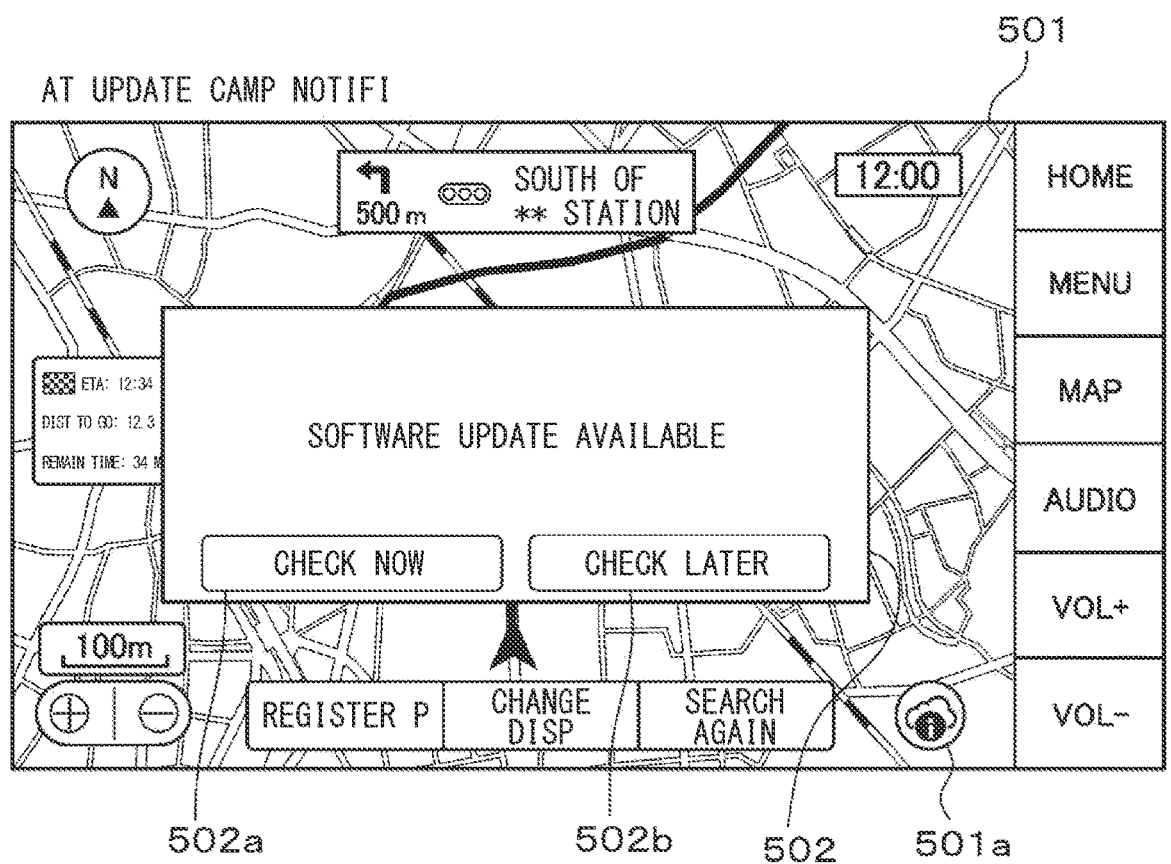
FIG. 9 is a diagram illustrating a screen at the time of the update campaign notification.

When the user operates the update campaign notification icon 501a in this state, as illustrated in FIG. 9, the HMI device 5 displays an update campaign notification screen 502 in a pop-up form on the navigation screen 501. The HMI device 5 may not be limited to displaying the update campaign notification screen 502 in a pop-up form, and may have other display features. On the update campaign notification screen 502, the HMI device 5 displays, for example, a guidance such as "software update is available" to notify the user of the occurrence of the update campaign notification, and displays a "check" button 502a and a "check later" button 502b to wait for the user operation. In this case, the user may proceed to the next screen for initiating rewriting of the application program by operating the "check" button 502a. When the user operates the "check later" button 502b, the HMI device 5 erases the pop-up display of the update campaign notification screen 502, and returns to the screen displaying the update campaign notification icon 501a illustrated in FIG. 8.

Figure 10:
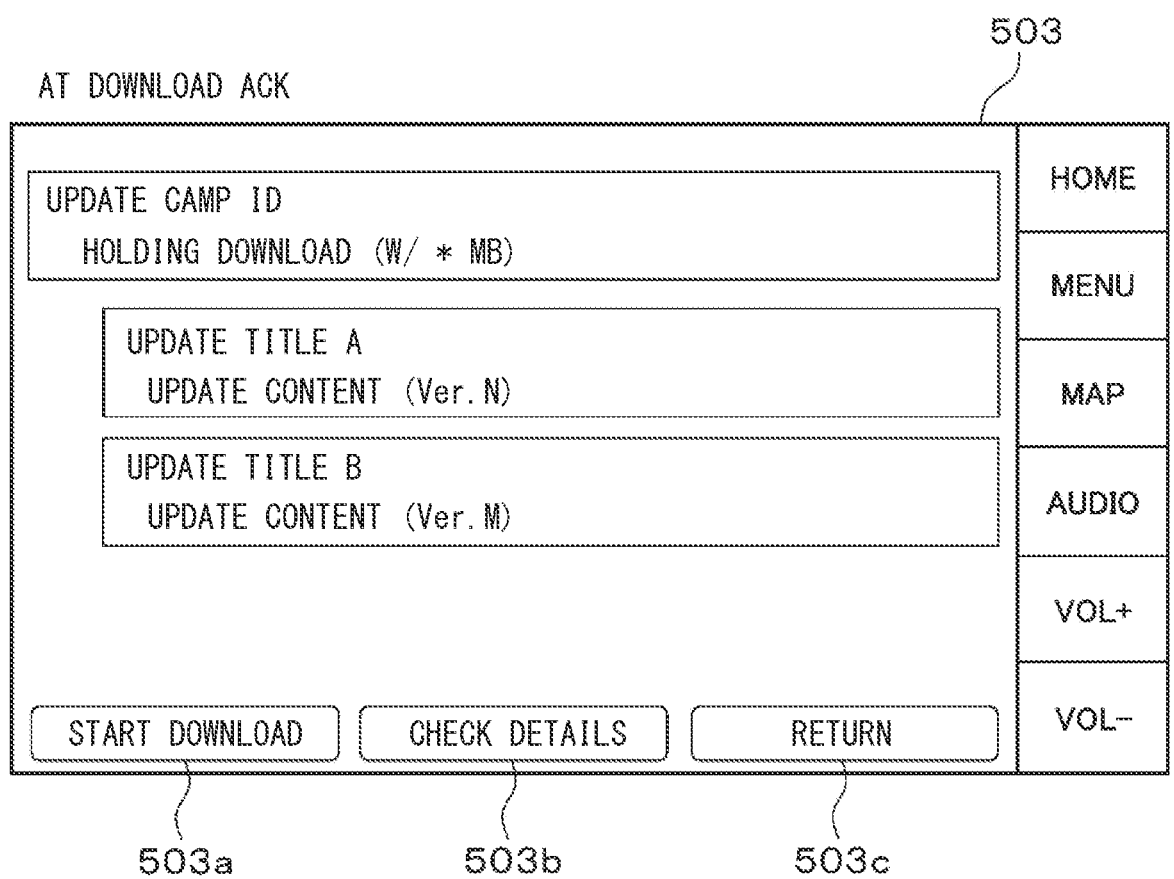
FIG. 10 is a diagram illustrating a screen when the download is acknowledged.

When the user operates the "check" button 502a in this state, as illustrated in FIG. 10, the HMI device 5 switches the display from the navigation screen 501 to a download acknowledgement screen 503, and displays the download acknowledgement screen 503. In the download acknowledgement screen 503, the HMI device 5 notifies the user of an update campaign ID or the title of the update, displays a "download start" button 503a, a "check details" button 503b, and a "return" button 503c, and waits for the user operation. In this case, the user may start downloading by operating the "download start" button 503a, display the details of the download by operating the "check details" button 503b, and cancel the download and return to the previous screen by operating the "return" button 503c. In the case where the "return" button 503c is operated, the user may proceed to a screen for initiating the download by operating the update campaign notification icon 501a.

Figure 11:
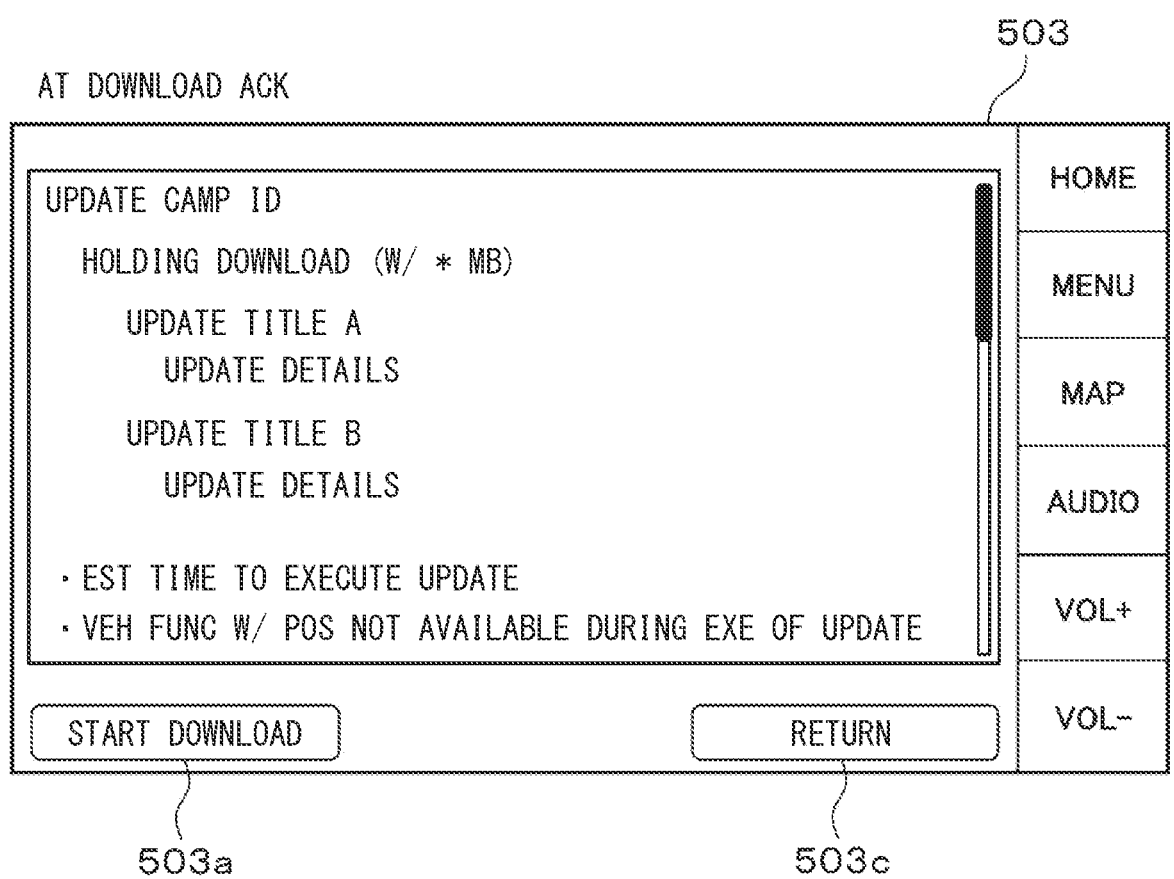
FIG. 11 is a diagram illustrating a screen when the download is acknowledged.
Figure 12:
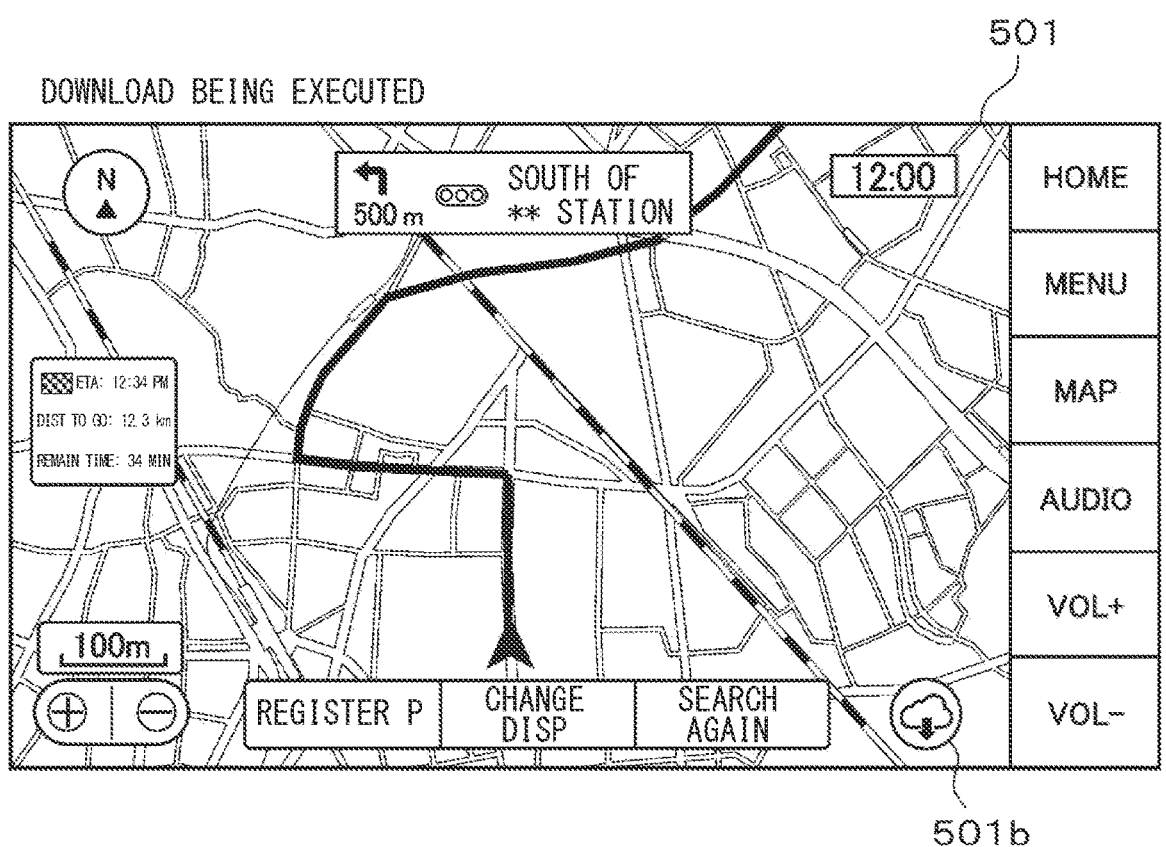
FIG. 12 is a diagram illustrating a screen during execution of download.

When the user operates the "check details" button 503b in a state in which the download acknowledgement screen 503 is displayed, as illustrated in FIG. 11, the HMI device 5 switches the display contents of the download acknowledgement screen 503 and displays the details of the download. The HMI device 5 displays a content of the update, the time required for the update, restrictions on vehicle functions due to the update, and the like by using the received distribution specification data as the details of the download. The "time required for update" is individually displayed, for example, X minutes, Y minutes, and Z minutes for each phase of download, installation, and activation. Also, when the user operates the "start download" button 503a, the HMI device 5 starts downloading the distribution package via the external communication device 4. In parallel to the start of the download of the distribution package, as illustrated in FIG. 12, the HMI device 5 switches the display from the download acknowledgement screen 503 to the navigation screen 501, displays the navigation screen 501 on the in-vehicle display 7 again, and displays a download-being-executed icon 501b indicating that the download is in progress on the lower right of the navigation screen 501. The user can recognize that the download of the distribution package is in progress by checking the display of the download-being-executed icon 501b.

Figure 13:
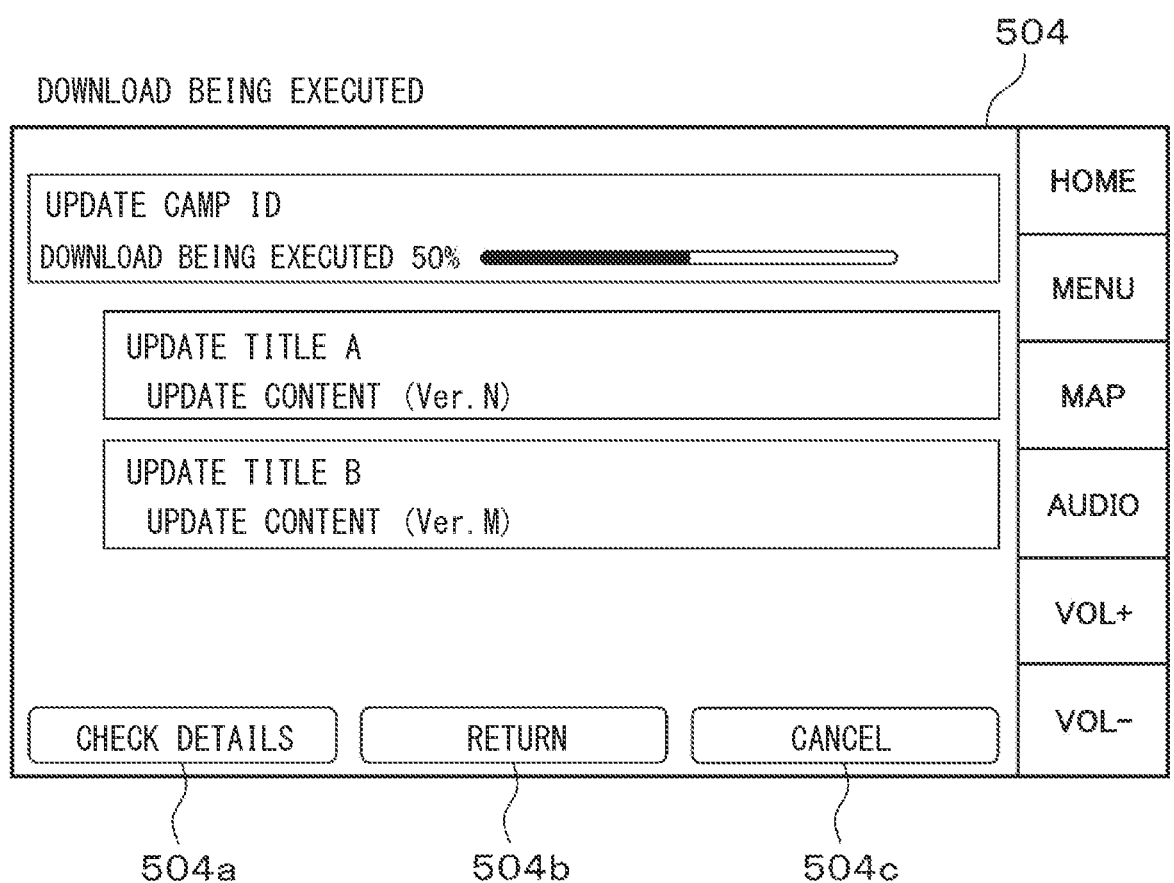
FIG. 13 is a diagram illustrating a screen during execution of download.

When the user operates the download-being-executed icon 501b in this state, as illustrated in FIG. 13, the HMI device 5 switches the display from the navigation screen 501 to a download-being-executed screen 504, and displays the download-being-executed screen 504. The HMI device 5 notifies the user that the download is in progress, displays a "check details" button 504a, a "return" button 504b, and a "cancel" button 504c on the download-being-executed screen 504, and waits for the user operation. In this case, the user can display details during download being executed by operating the "check details" button 504a, and can stop the download by operating the "cancel" button 504c.

Figure 14:
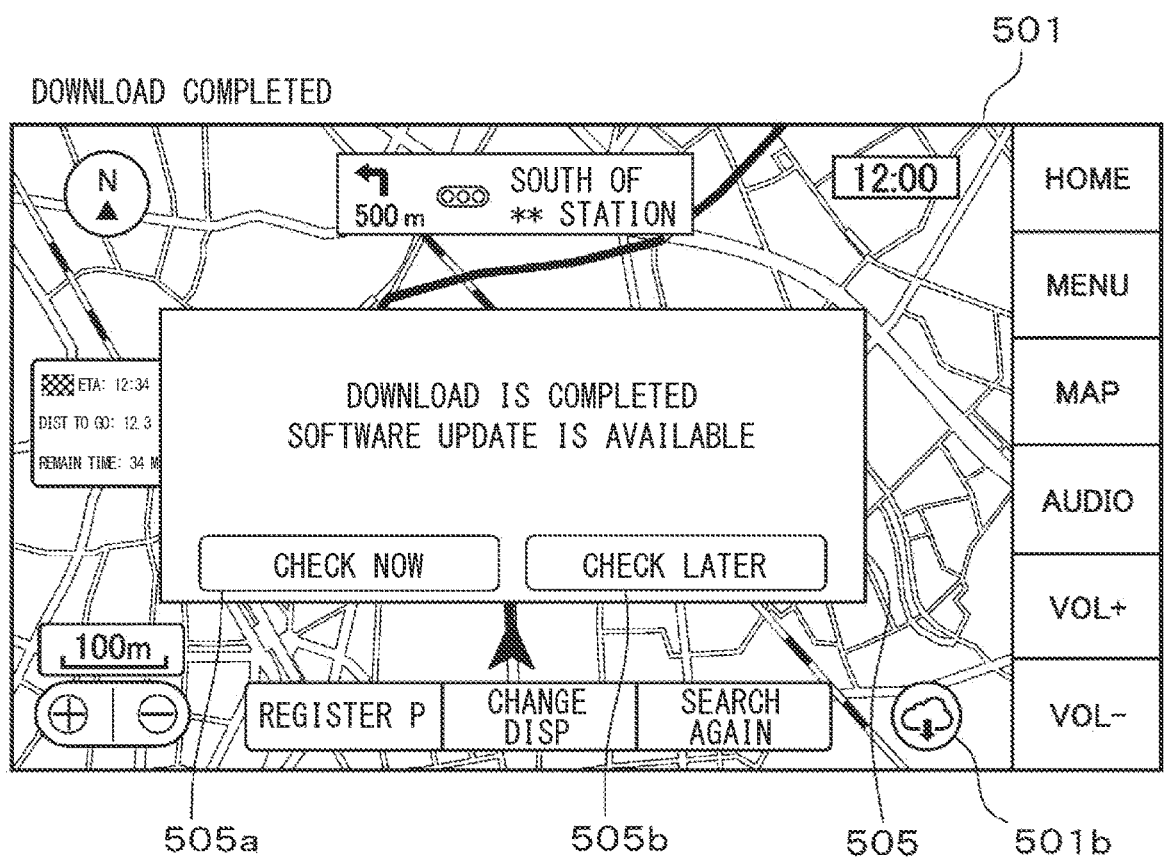
FIG. 14 is a diagram illustrating a screen when the download is completed.

When the download has been completed, the HMI device 5 displays a download completion notification screen 505 in a pop-up form on the navigation screen 501 as illustrated in FIG. 14. On the download completion notification screen 505, for example, the HMI device 5 displays a guidance such as "download is completed, and software update is available" to notify the user of the completion of the download, displays a "check" button 505a and a "check later" button 505b, and waits for the user operation. In this case, the user may proceed to a screen for starting installation by operating the "check" button 505a.

Figure 15:
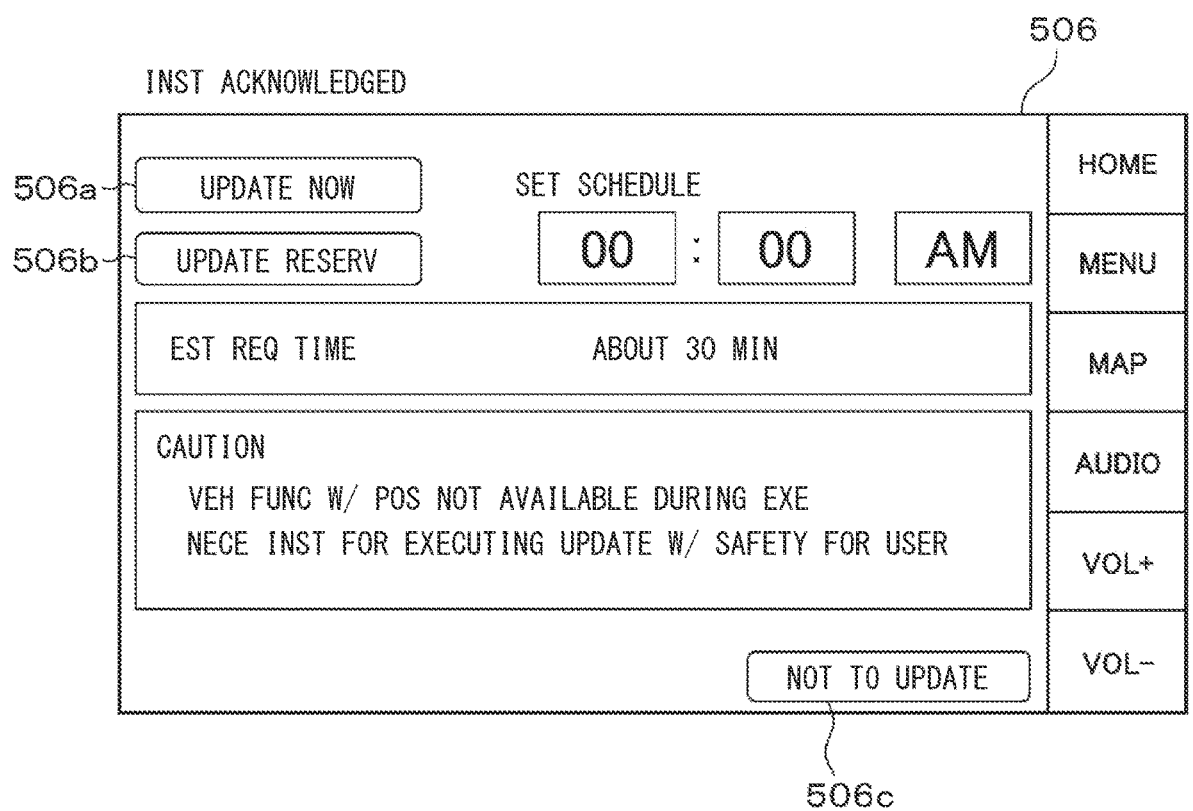
FIG. 15 is a diagram illustrating a screen when the installation is acknowledged.

When the user operates the "check" button 505a in this state, as illustrated in FIG. 15, the HMI device 5 switches the display from the navigation screen 501 to an installation acknowledgement screen 506, and displays the installation acknowledgement screen 506. On the installation acknowledgement screen 506, the HMI device 5 notifies the user of the time required for installation, or restrictions and setting of schedules, displays an "update now" button 506a, an "update reservation" button 506b, and a "not to update" button 506c, and waits for the user operation. In this case, the user may immediately start the installation by operating the "update now" button 506a. The user may also reserve and start the installation by setting the time at which the installation is to be performed and operating the "update reservation" button 506b. The user may cancel the installation and return to the previous screen by operating the "not to update" button 506c. In a case where the "not to update" button 506c is operated, the user may proceed to a screen for starting the installation by operating the download-being-executed icon 501b.

Figure 16:
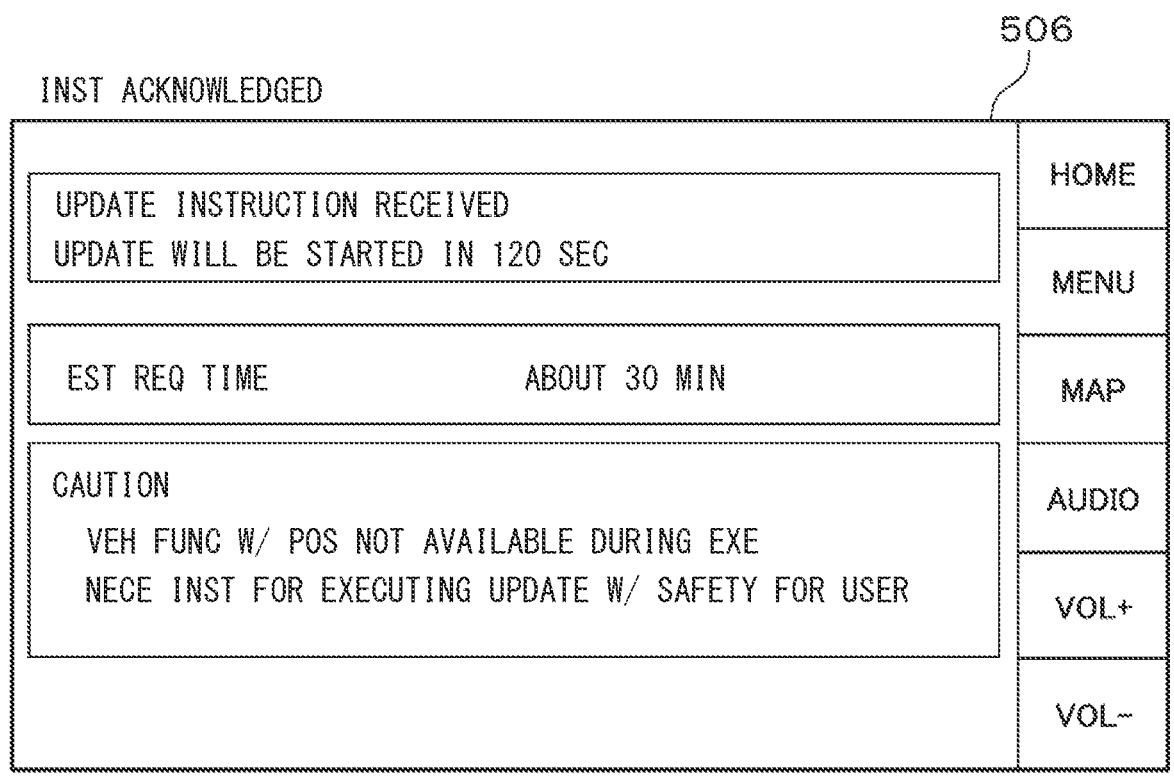
FIG. 16 is a diagram illustrating a screen when the installation is acknowledged.

When the user operates the "update now" button 506a from this state, the HMI device 5 switches the display contents of the installation acknowledgement screen 506 to display the installation details as shown in FIG. 16. The HMI device 5 receives an installation request on the installation acknowledgement screen 506 and notifies the user of starting the installation.

Figure 17:
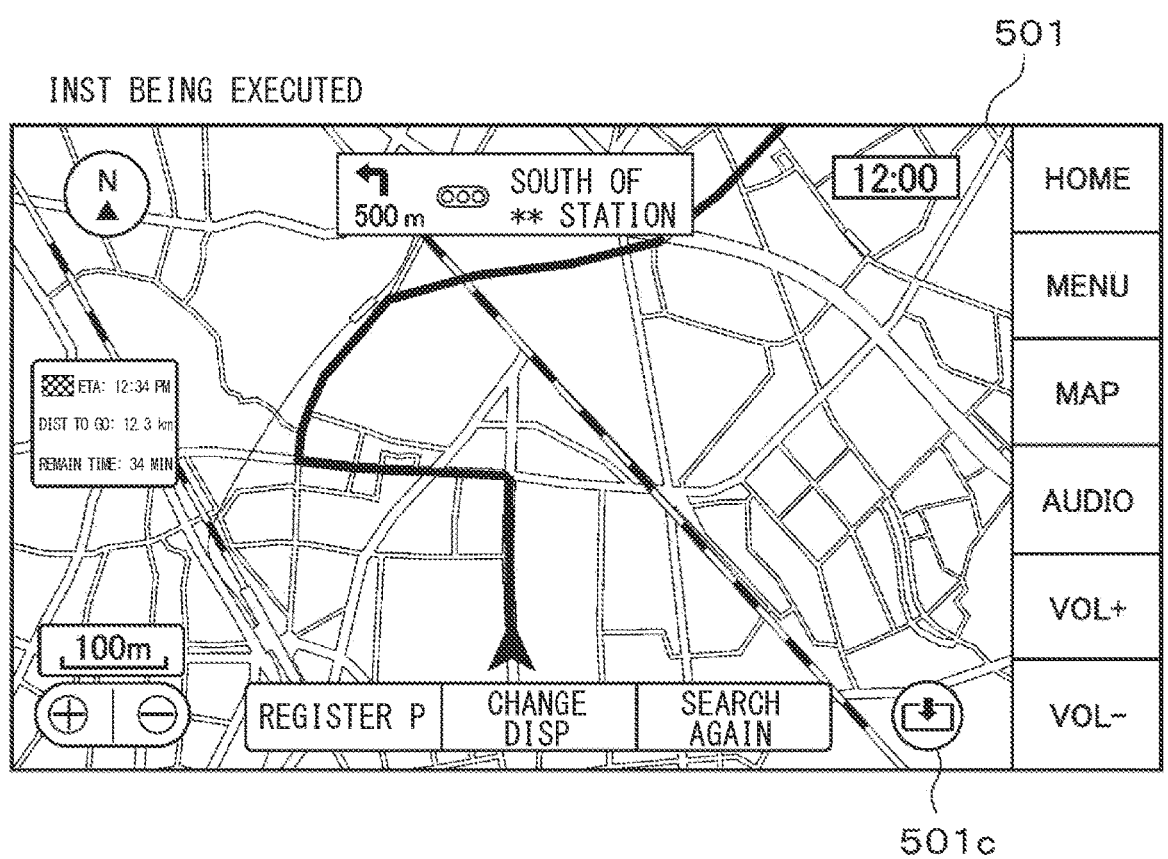
FIG. 17 is a diagram illustrating a screen during execution of the installation.

When starting the installation, as illustrated in FIG. 17, the HMI device 5 switches the display from the installation acknowledgement screen 506 to the navigation screen 501, displays the navigation screen 501 again, and displays an installation-being-executed icon 501c indicating that the installation is in progress on the lower right of the navigation screen 501. The user can recognize that the installation is in progress by checking the display of the installation-being-executed icon 501c.

Figure 18:
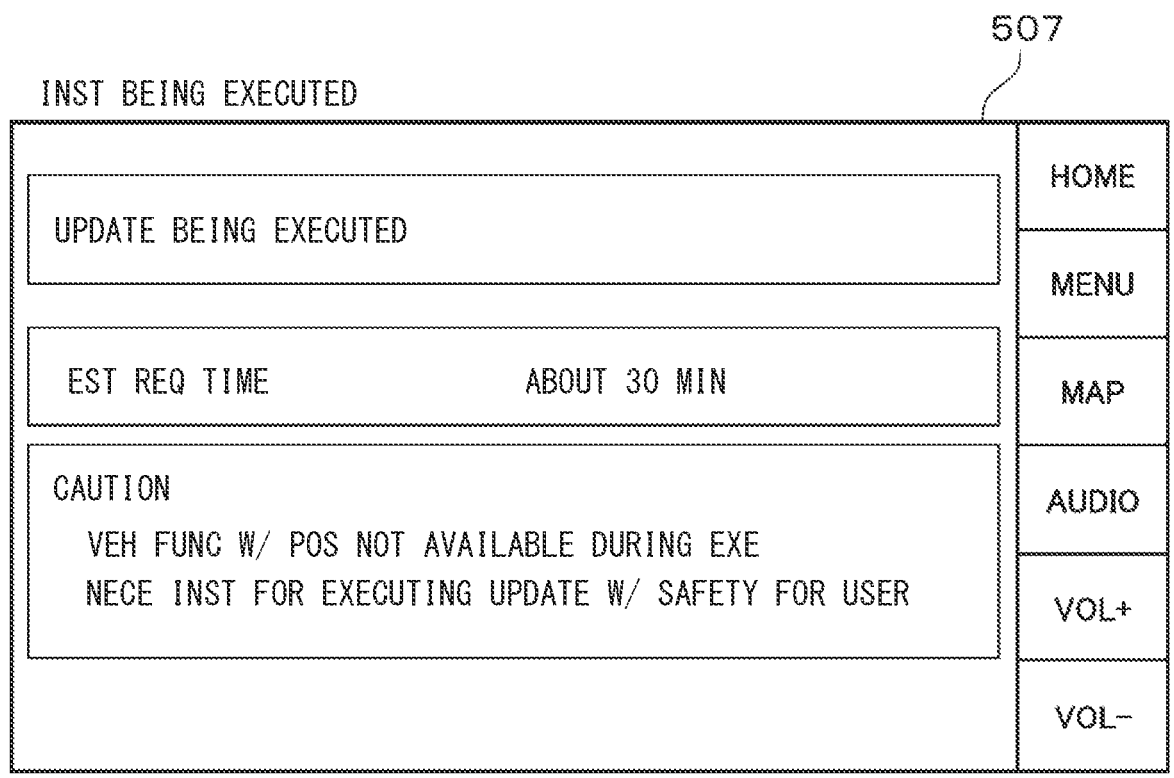
FIG. 18 is a diagram illustrating a screen during execution of the installation.

When the user operates the installation-being-executed icon 501c in this state, as illustrated in FIG. 18, the HMI device 5 switches the display from the navigation screen 501 to an installation-being-executed screen 507, and displays the installation-being-executed screen 507. The HMI device 5 notifies the user that the installation is in progress on the installation-being-executed screen 507. The HMI device 5 may, for example, cause the installation-being-executed screen 507 to show the remaining required time or the percentage-of-progress of the installation.

Figure 19:
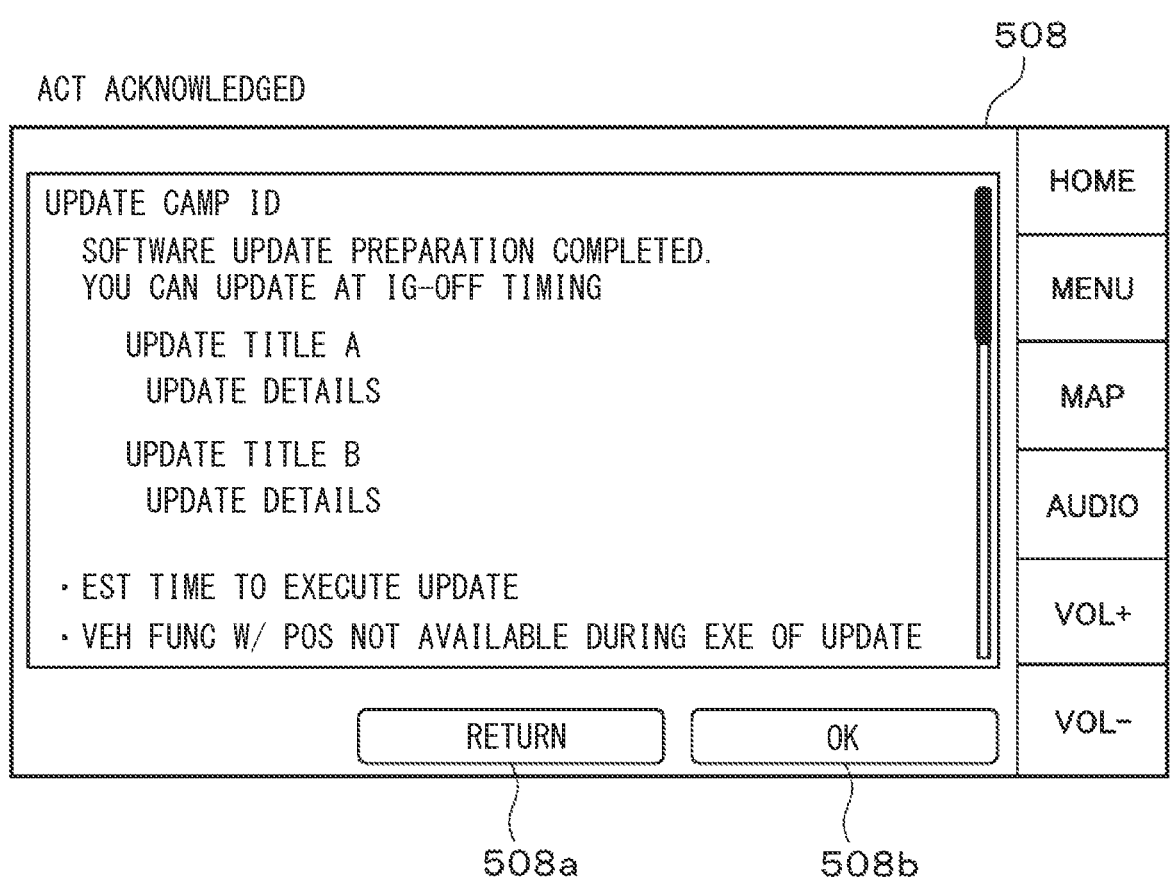
FIG. 19 is a diagram illustrating a screen when activation is acknowledged.

When the installation is completed, the HMI device 5 switches the display from the navigation screen 501 to the activation acknowledgement screen 508 to display the activation acknowledgement screen 508 as shown in FIG. 19. On the activation acknowledgement screen 508, the HMI device 5 notifies the user of a content of the activation and displays a "return" button 508a and an "OK" button 508b to wait for the user operation. In this case, the user may cancel the activation and return to the previous screen by operating the "return" button 508a. The user may acknowledge the activation by operating the "OK" button 508b. In a case where the "return" button 508a is operated, the user may proceed to a screen for executing the activation by operating the installation-being-executed icon 501c. Such display or acknowledgement may be omitted without being displayed by the user's settings or the progress steps of the program.

Figure 20:
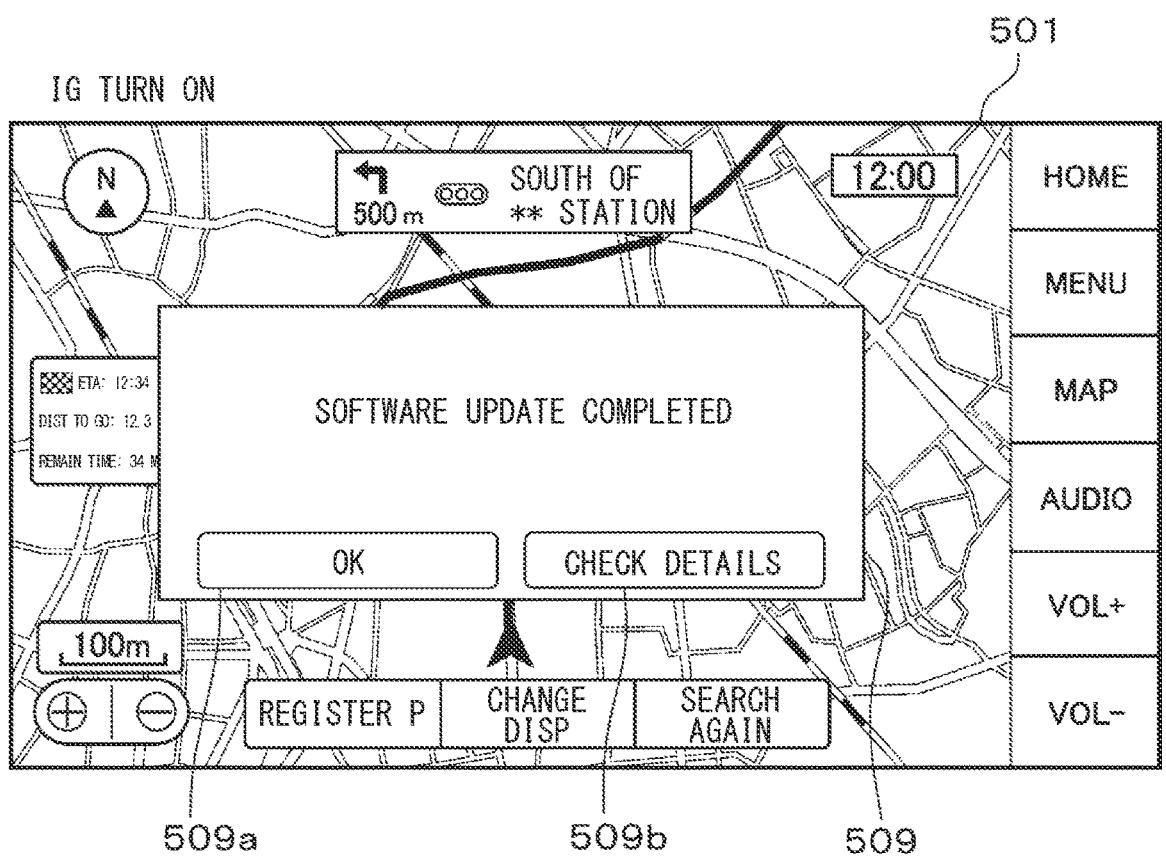

When the user turns on the IG power in the state after the user operates the "OK" button 508b, as illustrated in FIG. 20, the HMI device 5 displays an activation completion notification screen 509 in a pop-up form on the navigation screen 501. On the activation completion notification screen 509, the HMI device 5 displays, for example, a guidance such as "software update has been completed" to notify the user of the completion of the activation, displays an "OK" button 509a and a "check details" button 509b, and waits for the user operation. In this case, the user may erase the pop-up display on the activation completion notification screen 509 by operating the "OK" button 509a, and may display details of the completion of the activation by operating the "check details" button 509b.

Figure 21:
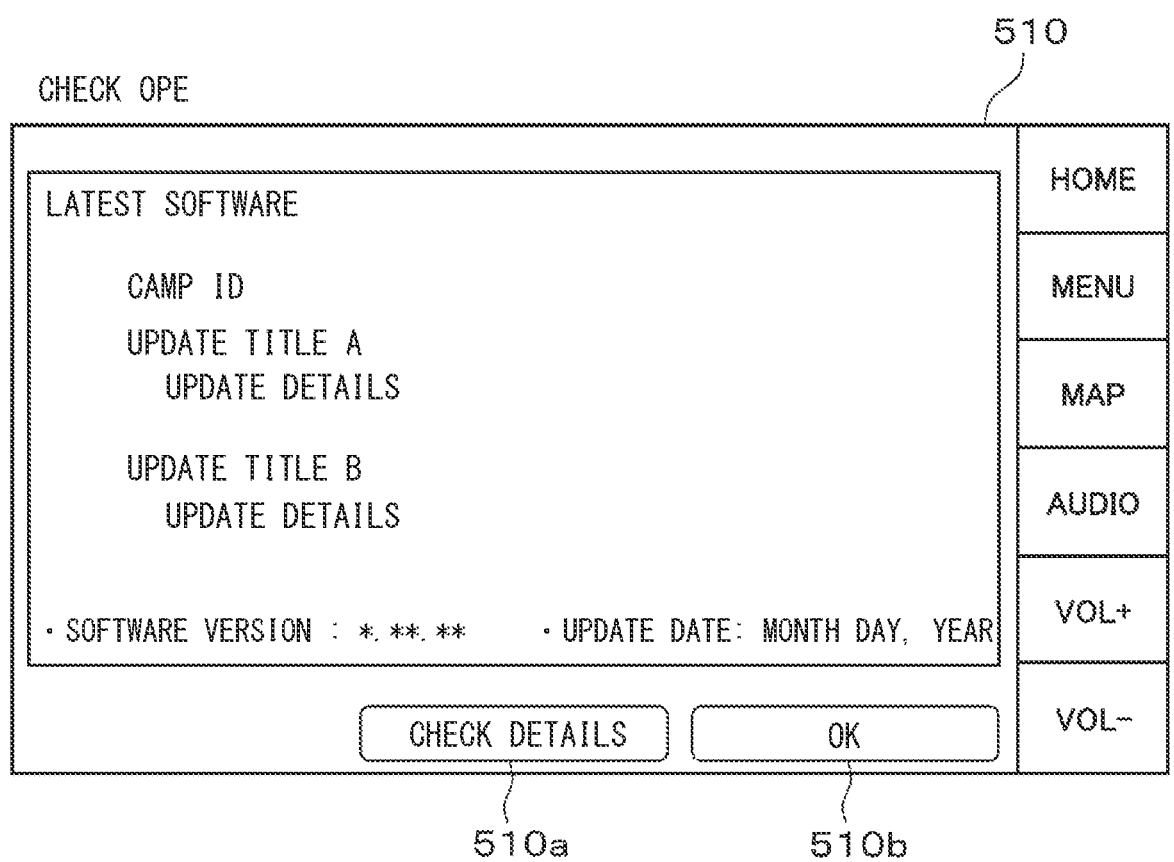
FIG. 21 is a diagram illustrating a screen during the check operation.

When the user operates the "OK" button 509a from this state, the HMI device 5 switches the display from the navigation screen 501 to the check operation screen 510 and displays the check operation screen 510 as shown in FIG. 21. On the check operation screen 510, the HMI device 5 notifies the user of the completion of the activation, displays a "check details" button 510a and an "OK" button 510b, and waits for the user operation. In this case, the user may display details of the completion of the activation by operating the "check details" button 510a.

Figure 22:
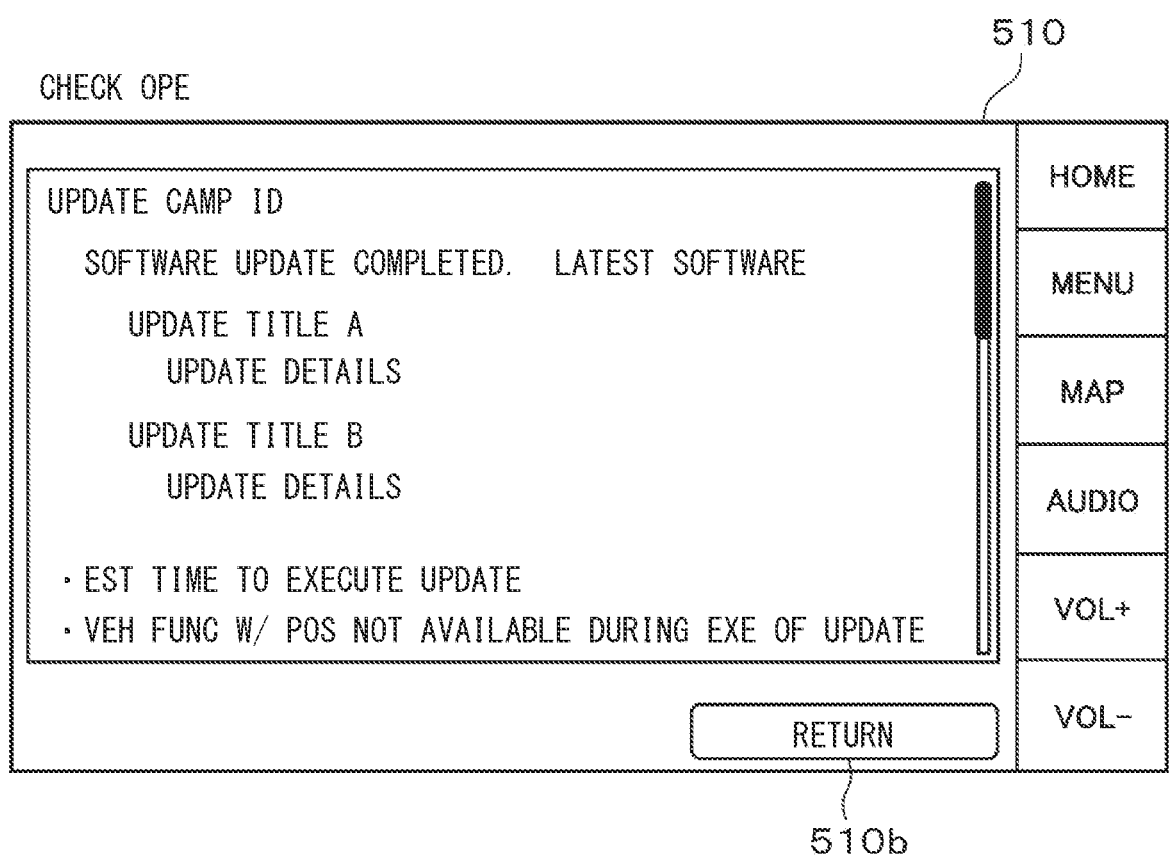
FIG. 22 is a diagram illustrating a screen during the check operation.

When the user operates the "check details" button 510a from this state, the HMI device 5 switches the display contents of the check operation screen 510 as shown in FIG. 22 to display the details of activation completion. The HMI device 5 displays a function added or changed due to the update as update details, and displays the "OK" button 510b. When the user operates the "OK" buttons 509a and 510b, the HMI device 5 determines that the user has confirmed the software update completion.

As described above, according to the third embodiment, when the application program of the ECU is rewritten, the OTA control unit 6 makes one inquiry to the user whether or not to acknowledge the execution for all phases in each phase of the download for acquiring the update program from the center device 2, the installation for writing the acquired update data to the target ECU, and the activation for activating the update program written in the ECU to validate the update program. Accordingly, each phase can be executed after confirming the user's consent for each phase.

Other Embodiments

Any one or more of the charge start time, the charge end time, the charge start and end time slot, and the charging time from the present time may be set for the charge schedule.

In the second embodiment, the charge device 10 may be used instead of the smart phone 14.

In the third embodiment, the inquiry to the user whether or not to acknowledge the execution may be made for any one or more phases.

During the charge period, "only download" operation or "download and install" operation may be performed. For example, if the charge time is longer than the time a required for downloading, an inquiry may be made to the user about execution and acknowledgement of downloading only. If the charge time is longer than a total time of the time a required for downloading and the time b required for installation, an inquiry may be made to the user regarding execution and acknowledgement of the download and installation. As a result, even if the charge time is not long enough to complete up to activation, some processing may be completed during charge.

While the present disclosure has been described with reference to embodiments thereof, it is to be understood that the disclosure is not limited to the embodiments and constructions. The present disclosure incorporates various modifications and variations within the scope of equivalents. Furthermore, various combination and formation, and other combination and formation including one, more than one or less than one element may be made in the present disclosure.

The control circuit and method described in the present disclosure may be implemented by a special purpose computer which is configured with a memory and a processor programmed to execute one or more particular functions embodied in computer programs of the memory. Alternatively, the control unit described in the present disclosure and the method thereof may be realized by a dedicated computer configured as a processor with one or more dedicated hardware logic circuits. Alternatively, the control unit and the methods according to the present disclosure may be achieved using one or more dedicated computers constituted by a combination of the processor and the memory programmed to execute one or more functions and the processor with one or more hardware logic circuits. The computer program may be stored, as instructions to be executed by a computer, in a tangible non-transitory computer-readable storage medium.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data update system for a plurality of electronic control devices comprising:
   an electric vehicle on which the plurality of electronic control devices are mounted;
   a charge device;
   a mobile terminal;
   a center device; and
   a charge schedule setting unit for setting a charge schedule for charging a battery of the electric vehicle based on an instruction of an user, wherein:
   the electric vehicle includes:
      a first communication device for communicating with the center device;
      an OTA control unit;
      a first charge control unit for charging the battery according to the charge schedule when the charge device is connected to the electric vehicle; and
      a first HMI device for receiving an operation relating to an updating of a data to be stored in one of the plurality of electronic control devices;
   the charge device includes:
      a second communication device for communicating with the center device;
      a second charge control unit for charging the battery according to the charge schedule when the charge device is connected to the electric vehicle; and
      a second HMI device for receiving an operation relating to the charging of the battery;
   the mobile terminal includes: a third communication device for communicating with the center device; and a third HMI device as the charge schedule setting unit;
   the third HMI device of the mobile terminal receives the operation relating to the updating of the data;
   the first communication device of the electric vehicle receives information on the operation relating to the updating of the data by the third HMI device of the mobile terminal and information on the operation relating to the charge schedule, from the center device; and
   the OTA control unit updates the data of the one of the electronic control devices as an update target by acquiring update data from the center device on a condition that an acknowledgement of the user relating to the updating of the data is obtained when receiving a notification that the data to be stored in the one of the electronic control devices and to be transmitted from the center device exists together with information about time required for the updating, and determining that the updating of the data is possible even if the first charge control unit of the electric vehicle charges the battery according to the charge schedule.

2. The data update system for the electronic control devices according to claim 1, wherein:
   the OTA control unit updates the data of the one of the electronic control devices as the update target by acquiring the update data from the center device on a condition that the acknowledgement of the user relating to the updating of the data is inquired and the acknowledgement of the user is obtained when determining that the updating of the data is possible while the first charge control unit of the electric vehicle charges the battery according to the charge schedule.

3. The data update system for the electronic control devices according to claim 1, wherein:
   the charge schedule setting unit sets, as the charge schedule, at least one of a charge start time, a charge end time, a start and end time of charging, and a charge time from a present time.

4. The data update system for the electronic control devices according to claim 1, wherein:
   the updating of the data includes:
      a first phase of acquiring the update data from the center device;
      a second phase of writing an acquired update data to the one of the electronic control devices as the update target; and
      a third phase of validating the update data written to the one of the electronic control devices;
   the OTA control unit includes an user interface unit for a user to perform an input operation; and
   the OTA control unit executes one or more phases after confirming that the input operation for acknowledging execution of the one or more phases is performed by the user.

5. The data update system for the electronic control devices according to claim 4, wherein:
   the OTA control unit inquires at least once whether the user acknowledges execution of all phases.

6. The data update system for the electronic control devices according to claim 1, further comprising:
   one or more processors; and
   a memory coupled to the one or more processors and storing program instructions that when executed by the one or more processors cause the one or more processors to provide at least: the mobile terminal; the center device; and the charge schedule setting unit.

7. A data update system for a plurality of electronic control devices comprising:
   a center device for transmitting information on updating data to be stored in one of the plurality of electronic control devices and update data to a vehicle in which the plurality of electronic control devices are mounted;
   a charge schedule setting unit for setting a charge schedule for charging a battery of an electric vehicle equipped with the plurality of electronic control devices, based on an instruction of an user;
   a charge schedule transmission unit for transmitting information about a charge schedule to the center device;
   a charge control unit for charging the battery according to the charge schedule when a charge device is connected to the electric vehicle; and
   a data update control unit for acquiring the update data from the center device and updating the data of the one of the plurality of electronic control devices as an update target, wherein:
   the center device transmits information on the updating to the electric vehicle and causes the data update control unit to execute updating the data when determining based on time required for the updating of the data that the updating of the data is possible even if the charge control unit of the electric vehicle charges the battery according to the charge schedule in a case where the data to be stored in the one of the electronic control devices mounted on the electric vehicle that has transmitted the charge schedule to the center device is updated in the center device.

8. The data update system for the plurality of electronic control devices according to claim 7, wherein:
   the charge schedule setting unit sets, as the charge schedule, at least one of a charge start time, a charge end time, a start and end time of charging, and a charge time from a present time.

9. The data update system for the plurality of electronic control devices according to claim 7, wherein:
   the updating of the data includes:
      a first phase of acquiring the update data from the center device;
      a second phase of writing an acquired update data to the one of the electronic control devices as the update target; and
      a third phase of validating the update data written to the one of the electronic control devices;
   the electric vehicle includes:
      a user interface unit for a user to perform an input operation; and
      an input operation information transmission unit for transmitting information on the input operation to the center device; and
   the center device executes one or more phases after confirming that the input operation for acknowledging execution of the one or more phases is performed by the user.

10. The data update system for the plurality of electronic control devices according to claim 7, further comprising:
   one or more processors; and
   a memory coupled to the one or more processors and storing program instructions that when executed by the one or more processors cause the one or more processors to provide at least: the center device; the charge schedule setting unit; the charge schedule transmission unit; the charge control unit; and the data update control unit.

* * * * *